United States Patent [19]

Skvortsov et al.

[11] 4,056,600

[45] Nov. 1, 1977

[54] METHOD OF SELECTIVE CATALYTIC PURIFICATION OF WASTE GASES FROM NITROGEN OXIDES

[76] Inventors: Gennady Alexeevich Skvortsov, ulitsa Kima, 32, kv. 50; Nellya Nikitichna Nizeeva, ulitsa Lermontova, 17, kv. 4; Avrum Iosifovich Podzharsky, ulitsa Juzhnaya, 12, kv. 10; Irma Viktorovna Dobrovolskaya, ulitsa Prokhodnoi tupik, 3, kv. 2-a, all of Dneprodzerzhinsk Dnepropetrovskoi oblasti, U.S.S.R.

[21] Appl. No.: 769,214

[22] Filed: Feb. 16, 1977

Related U.S. Application Data

[63] Continuation of Ser. No. 476,045, June 3, 1974, abandoned.

[51] Int. Cl.$^2$ ............................................. B01D 53/00
[52] U.S. Cl. ............................................................ 423/239
[58] Field of Search ................... 423/235, 239, 213.2, 423/213.7; 252/461, 471

[56] References Cited

U.S. PATENT DOCUMENTS

| 3,279,884 | 10/1966 | Nonnenmacher et al. | 423/239 |
| 3,864,451 | 2/1975 | Lee et al. | 423/239 |
| 3,887,683 | 6/1975 | Abe et al. | 423/239 X |
| 4,010,238 | 3/1977 | Shiraishi et al. | 423/239 |

*Primary Examiner*—G. O. Peters
*Attorney, Agent, or Firm*—Steinberg & Blake

[57] ABSTRACT

The method of selective catalytic purification of waste gases from nitrogen oxides consists in that the waste gas to be treated is passed, together with gaseous ammonia, through the bed of a catalyst at a temperature of 100°–500° C, a volumetric velocity of the waste gas of 5000 – 100000 hour$^{-1}$ and a volumetric ratio of ammonia to nitrogen oxides of 0.7 – 1.5. The catalyst used in the proposed method is actually oxides of vanadium and of manganese that are taken in the weight ratio $V_2O_5/Mn_2O_3$ of 0.1 – 30, the total quantity of the metal oxides being from 5 to 40 percent with respect to the total weight of the catalyst.

5 Claims, 1 Drawing Figure

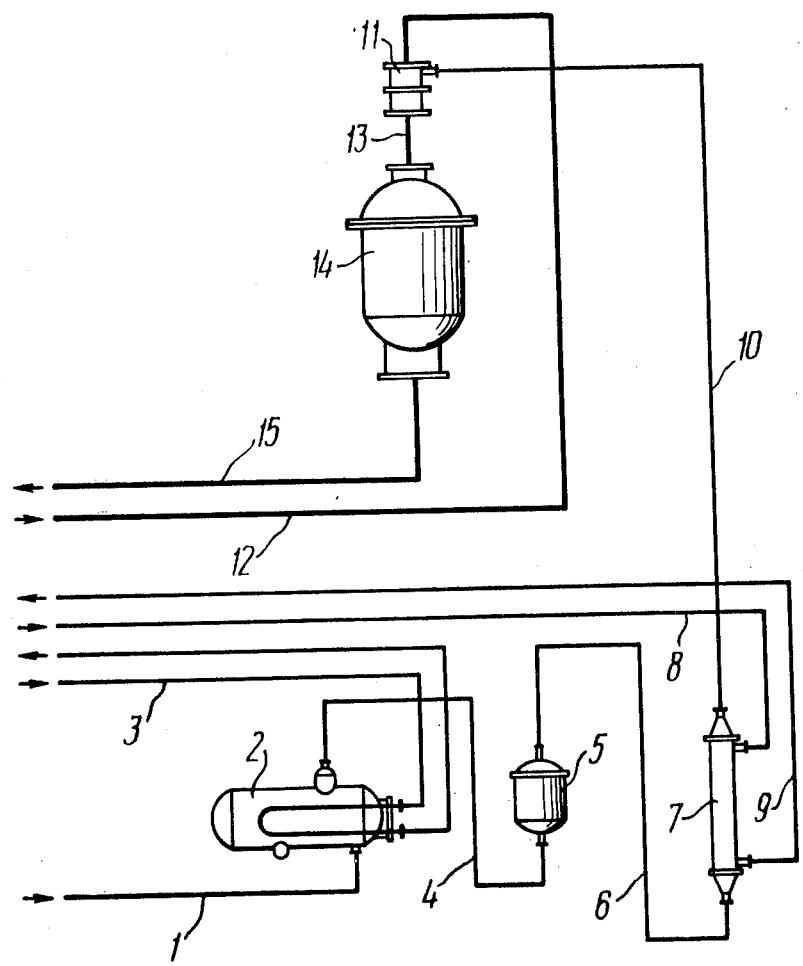

METHOD OF SELECTIVE CATALYTIC PURIFICATION OF WASTE GASES FROM NITROGEN OXIDES

This is a continuation of application Ser. No. 476,045, filed June 3, 1974, now abandoned.

This invention relates to a method of selective catalytic purification of waste gases from nitrogen oxides.

The proposed method can be used in purifying waste gases from nitrogen oxides, for example purifying gases discharged into the atmosphere at enterprises producing nitric and sulphuric acids, ammonium nitrite and sodium nitrite, some catalysts, and some products of organic synthesis.

It is known that in the production of nitric acid, due to incomplete conversion of nitrogen oxides into nitric acid, waste gases contain 0.05 – 0.5 percent by volume of nitrogen oxides and 3 – 6 percent by volume of oxygen.

The content of nitrogen oxides in waste gases in some organic syntheses and in the manufacture of some catalysts can be as high as 1 percent by volume.

For sanitary considerations such waste gases cannot be discharged into the atmosphere without preliminary purification from nitrogen oxides.

Known in the prior art are methods of catalytic purification of waste gases from nitrogen oxides, in which nitrogen oxides are reduced by combustible gases such as hydrogen, carbon monoxide, methane, and other unsaturated hydrocarbons in the presence of catalysts containing precious metals such as palladium, rhodium, ruthenium, and platinum. Oxygen is also removed from waste gases in such treatment, and this involves considerable consumption of reducing gas.

It is known that ammonia selectively reacts with nitrogen oxides in the presence of oxygen. By selectivity it is understood that nitrogen oxides can be reduced on a catalyst in the presence of oxygen irrespectively of its content in the impure waste gas. The selectivity is, however, determined by the type of the catalyst used in the process.

The known method of selective catalytic purification of waste gases from nitrogen oxides in the presence of gaseous ammonia with the catalyst which is tabletted oxides of vanadium, manganese, iron, is carried out at a temperature of 20° – 400° C, preferably at 250° C, at a volumetric velocity of the waste gas of 3000 – 1000000 hour$^{-1}$ with ammonia being taken in the quantity 1.5 – 2 times exceeding the stoichiometric, and at the volumetric ratio of ammonia to nitrogen oxides of 1.5 – 1.9.

However, the degree of waste gas purification from nitrogen oxides by these methods with the specified excess of ammonia is rather low, or a sufficiently high degree of purification is attained only within a narrow range of temperatures.

The object of this invention is to provide a method of selective catalytic purification of waste gases from nitrogen oxides that would ensure practically complete removal of nitrogen oxides from waste gases at a minimum ammonia content of purified gas.

Another object of the invention is to find a catalyst for the proposed method which would possess high activity and selectivity within a wide range of temperatures.

In accordance with these and other objects, the essence of this invention consists in that the method of selective catalytic purification of waste gases from nitrogen oxides is effected by passing waste gases through the bed of a catalyst at a temperature of 100° – 500° C at a volumetric velocity of the waste gas of 5,000 – 100,000 hour$^{-1}$ and at a volumetric ratio of the gaseous ammonia to nitrogen oxides of 0.7 – 1.5; the catalyst according to the invention consists of oxides of vanadium and manganese, which are applied to an inert carrier, the weight ratio of the metal oxides being $V_2O_5/Mn_2O_3$ of 0.1 – 30, the total content of the metal oxides being 5 – 40 percent with respect to the weight of the catalyst.

Owing to the presence of manganese oxide in the catalyst and due to the specific weight ratio of the oxides of vanadium and manganese, the catalyst used in the method according to the invention possesses high activity that ensures purification of waste gases from nitrogen oxides up to 99 percent within the range of temperatures from 200 to 400° C, while the high selectivity for the catalyst allows of reducing the requirement for ammonia almost to the stoichiometric quantity.

Another important advantage of the proposed method, compared with the known one, is almost complete removal of nitrogen oxides from waste gases (to 0.001 – 0.005 percent by volume) with the residual ammonia content of the purified waste gas being less than 0.01 percent by volume.

The catalyst used in the proposed method makes it possible to carry out the process of waste gas purification from nitrogen oxides in the presence of sulphur dioxide, chlorine, and carbon monoxide, the activity of the catalyst being unaffected.

The proposed method for selective catalytic purification of waste gases from nitrogen oxides should preferably be carried out as described below. (The diagram, which is appended, shows the flow-sheet of the process).

According to the flow-sheet diagram, ammonia, which is required in the process, is prepared by evaporating liquid ammonia delivered through a pipe-line 1 into on evaporator 2, into which hot water or steam are delivered through a pipeline 3. Gaseous ammonia is separated from oil and catalytic dust in a filter 5, into which it is fed through a pipe-line 4, and the filtered ammonia is delivered into a heat-exchanger 7 through a pipe-line 6.

In the heat-exchanger, ammonia gas is heated by steam which is delivered through a pipe-line 8. The condensate is removed from the heat-exchanger 7 through a pipe-line 9.

From the heat-exchanger 7, along a pipe-line 10, the gaseous ammonia is delivered into a mixer 11, into which, through a pipe-line 12, is also delivered waste (containing nitrogen oxides) heated to a temperature of 200° C. Gaseous ammonia is delivered into the mixer 11 in a quantity ensuring the volumetric ratio of ammonia to nitrogen oxides within the range of 0.7 – 1.5, depending on the degree of oxidation of nitrogen oxide.

The obtained gaseous mixture is delivered through a pipe-line 13 into a reactor 14, where nitrogen oxides are reduced on the catalyst by ammonia. The process is carried out in the reactor 14 at a temperature from 100° to 500° C, preferably at 200° – 400° C, at a volumetric velocity of the waste gase of 5,000 – 100,000 hour$^{-1}$.

From the reactor 14, waste gas, purified from nitrogen oxides, is discharged into atmosphere through a pipe-line 15.

The proposed catalyst ensures high selectivity of the process.

The process of selective catalytic purification of waste gases, for example waste gases in the manufacture of nitric acid, is known to be actually catalytic reduction of nitrogen oxides with ammonia according to the following equations:

$$4NH_3 + 6NO = 5N_2 + 6H_2O + 430 \text{ kcal} \quad (1)$$

$$8NH_3 + 6NO_2 = 7N_2 + 12H_2O + 663 \text{ kcal} \quad (2)$$

A parallel reaction of ammonia oxidation with oxygen, that is present in waste gases, also takes place on the catalyst:

$$4NH_3 + 3O_2 = 2N_2 + 6H_2O + 303 \text{ kcal} \quad (3)$$

The ratio of the rates of reactions (1), (2) and (3) depends on the volumetric ratio of ammonia to nitrogen oxides in the waste gas, on the particular catalyst used, on the process temperature, and practically does not depend on the oxygen content in the waste gas.

The use of the catalyst of the composition specified above in the process at temperature from 200 to 400° C results in the residual nitrogen oxides content in the purified gas being 0.005 percent by volume, their initial content in the waste gas being from 0.1 to 0.4 percent by volume.

Sulphur dioxide, chlorine, or carbon monoxide that are present in waste gases in quantities to 0.4 percent by volume do not produce any effect on the action of the catalyst, and hence the presence of these admixtures does not hinder the process of nitrogen oxides removal from waste gases.

For a better understanding of the invention, the following examples of its practical embodiment are given by way of illustration.

EXAMPLE 1

The catalyst having the composition, in percent by weight, $V_2O_5$ 1, $Mn_2O_3$ 10, $\gamma Al_2O_3$ 89, the total content of oxides of vanadium and of manganese being 11 percent by weight, in which the ratio of $V_2O_5$ to $Mn_2O_3$ is 0.1, is prepared as follows. First an aqueous solution of oxalic acid having the concentration of 21.9 g/liter is prepared by dissolving 3.07 g of oxalic acid in 100 ml of distilled water and then, with stirring, 1.42 g of ammonium metavanadate is added. To the obtained solution of ammonium oxalate-vanadate, are added 27.8 g of manganese chloride, its quantity being selected so that the weight ratio of ammonium oxalate-vanadate to the manganese salt (calculated with reference to the ratio of the metals oxides $V_2O_5/Mn_2O_3$) is 0.1. As soon as manganese chloride has been dissolved, 100 g of a carrier, $Al_2O_3$, which has been calcined at a temperature of 110° C for 5 hours, are loaded into the solution and soaked in it for 40 minutes at a temperature of 30° – 40° C. The impregnated carrier is then dried at a temperature of 110° – 120° C and finally calcined at a temperature of 400° – 600° C. The thus-prepared catalyst, having a grain size of 2 – 3 mm, is tested on a laboratory plant at atmospheric pressure and at a volumetric velocity of the gas of 10000 hour$^{-1}$ in the process of nitrogen oxides reduction with ammonia.

An artificially prepared gaseous mixture is used to test the catalyst. It has the following composition in percent by volume: NO 0.2 – 0.3, $NO_2$ 0.1 – 0.12, $NH_3$ 0.34 – 0.50, $O_2$ 4 – 6, nitrogen being the balance.

The volumetric ratio of ammonia to nitrogen oxides $$\frac{V_{NH_3}}{V_{NO} + V_{NO_2}}$$

in the gaseous mixture is 1.1 – 1.2.

Said gaseous mixture is passed through a bed of the catalyst at various temperatures. The residual concentration of nitrogen oxides is determined in the treated gas and the degree of purification is determined.

The experimental data show that at temperatures within the range from 220° to 320° C, the degree of gas purification from nitrogen oxides is 96 – 98 percent, and the selectivity of the catalyst is 85 – 90 percent.

| Temperature, °C | Purification degree, % | Selectivity, % |
|---|---|---|
| 200 | 96 | 90 |
| 240 | 97 | |
| 260 | 98 | |
| 260 | 98 | 85 |
| 320 | 97 | 85 |
| 360 | 90 | 80 |

EXAMPLE 2

The catalyst having the composition, in percent by weight: $V_2O_5$ 6, $Mn_2O_3$ 6, $Al_2O_3$ 88, the total content of the oxides of vanadium and of manganese being 12 percent by weight at the weight ratio of $V_2O_5/Mn_2O_3$ = 1, is prepared as follows. First an aqueous solution of oxalic acid, having the concentration of 133 g/liter is prepared by dissolving 18.6 g of oxalic acid in 100 ml of distilled water. The solution is stirred thoroughly and then 8.65 g of ammonium metavanadate and 16.82 g of manganese chloride are added. The weight ratio of ammonium oxalate-vanadate to the manganese salt (calculated as the metal oxides $V_2O_5/Mn_2O_3$) in the thus-prepared solution should be 1.

The further procedure, and also the conditions for testing the prepared catalyst are the same as described in Example 1.

| Temperature, °C | Purification degree, % | Selectivity, % |
|---|---|---|
| 200 | 82 | 100 |
| 240 | 94 | 88 |
| 280 | 97 | 85 |
| 320 | 92 | 83 |
| 360 | 90 | 80 |

EXAMPLE 3

The catalyst having the composition, in percent by weight: $V_2O_5$ 15, $Mn_2O_3$ 0.5, $\gamma Al_2O_3$ 84.5, the total content of the oxides of vanadium and of manganese being 15.5 percent by weight at the ratio of $V_2O_5$ to $Mn_2O_3$ of 30, is prepared by a procedure similar to that described in Example 1. To that end, 22.25 g of ammonium metavanadate and then 1.45 g of manganese chloride are dissolved in 100 ml of an aqueous solution of oxalic acid having a concentration of 350 g/liter. The weight ratio of ammonium oxalate-vanadate to the manganese salt (calculated as the ratio of the metal oxides $V_2O_5/Mn_2O_3$) in the prepared solution is 30.

The further procedure for preparing the catalyst and also the conditions of its testing are the same as described in Example 1.

According to the data obtained, at temperatures within the range from 140° to 400° C, the degree of gas purification from nitrogen oxides is 92 – 99 percent, and the selectivity is 75 – 100 percent.

| Temperature, °C | Purification degree, % | Selectivity, % |
| --- | --- | --- |
| 120 | 88 | 100 |
| 140 | 95 | 100 |
| 160 | 98 | 98 |
| 180 | 97 | 98 |
| 200 | 99 | 95 |
| 300 | 97 | 88 |
| 400 | 92 | 75 |
| 500 | 90 | 70 |

EXAMPLE 4

The catalyst having the composition, in percent by weight: $V_2O_5$ 30, $Mn_2O_3$ 10, $\gamma Al_2O_3$ 60, at the total content of the oxides of vanadium and of manganese of 40 percent by weight and a weight ratio of $V_2O_5$ to $Mn_2O_3$ of 3, is prepared as follows. First 55 g of ammonium metavanadate and then 35 g of manganese chloride are dissolved in 300 ml of an aqueous solution of oxalic acid having a concentration of 290 g/liter.

The weight ratio of ammonium oxalate-vanadate to the manganese salt in the prepared solution, calculated as the ratio of the metal oxides $V_2O_5/Mn_2O_3$, is 3. The further procedure for preparing the catalyst is the same as in Example 1, except that after calcining, the impregnating, and all other operations that follow, are repeated once more.

The thus-prepared catalyst is tested as described in Example 1.

The degree of purification of gas from nitrogen oxides at a temperature of 280° C is 97 percent.

EXAMPLE 5

The catalyst having the composition, in percent by weight $V_2O_5$ 4, $Mn_2O_3$ 1, $\gamma Al_2O_3$ 95, the total content of the oxides of vanadium and of manganese being 5 percent by weight at the weight ratio of $V_2O_5$ to $Mn_2O_3$ of 4, is prepared by a procedure similar to that described in Example 1, by dissolving first 5.6 g of ammonium metavanadate and then 2.63 g of manganese chloride in 100 ml of an aqueous solution of oxalic acid having a concentration of 87 g/liter. The weight ratio of ammonium oxalate-vanadate to the manganese salt (calculated as the ratio of the metal oxides) is in this solution 4. The further procedure for preparing the catalyst and also the conditions for its testing are the same as described in Example 1.

The degree of purification from nitrogen oxides, at a temperature of 280° C, is 96 percent.

EXAMPLE 6

The catalyst having the composition, in percent by weight: $V_2O_5$ 4, $Mn_2O_3$ 1, quartz 95, the total content of the oxides of vanadium and of manganese being 5 percent by weight, at the weight ratio of $V_2O_5/Mn_2O_3$ of 4, is prepared and tested as described in Example 1.

The purification degree from nitrogen oxides, at a temperature of 280° C, is 88 percent.

EXAMPLE 7

The catalyst having the composition, in percent by weight: $V_2O_5$ 4, $Mn_2O_3$ 1, silica gel 95, the total content of the oxides of vanadium and of manganese being 5 percent by weight, and at the weight ratio of $V_2O_5/Mn_2O_3$ of 4, is prepared and tested as described in Example 1.

The purification degree, at a temperature of 280° C, is 92 percent.

EXAMPLE 8

The catalyst having the composition, in percent weight: $V_2O_5$ 4, $Mn_2O_3$ 1, chamotte 95, the total content of the oxide of vanadium and of manganese being 5 percent by weight at the weight ratio of $V_2O_5$ to $Mn_2O_3$ of 4, is prepared and tested by the procedure described in Example 1.

The degree of purification from nitrogen oxides at a temperature of 280° C, is 90 percent.

EXAMPLE 9

The catalyst, having the composition, in percent by weight, $V_2O_5$ 4, $Mn_2O_3$ 1, $\gamma Al_2O_3$ 95, the total content of the oxides of vanadium and of manganese being 5 percent by weight, at the weight ratio of $V_2O_5/Mn_2O_3$ of 4, is prepared as in Example 1.

The degree of purification from nitrogen oxides at a temperature of 280° C, is 95 percent.

EXAMPLE 10

The catalyst having the composition as in Example 4, is prepared by a procedure described in Example 4, by dissolving first 42 g of vanadium pentoxide and then 35 g of manganese chloride in 300 ml of an aqueous solution of oxalic acid having a concentration of 290 g/liter.

The obtained solution is tested as described in Example 1.

The degree of purification from nitrogen oxides is, at the temperature of 280° C, 98 percent.

EXAMPLE 11

The catalyst having the composition as in Example 3, is prepared by a procedure described in Example 1, by dissolving first 22.25 g of ammonium metavanadate and then 2.09 g of manganese nitrate in an aqueous solution of oxalic acid having a concentration of 350 g/liter. The further procedure for preparing the catalyst, and the conditions for its testing are similar to those described in Example 1. The degree of purification from nitrogen oxides, at a temperature of 280° C is 98 percent.

EXAMPLE 12

The catalyst having the composition as in Example 3, is tested as described in Example 1, at a temperature of 260° C, only changing the volumetric ratio of ammonia to nitrogen oxides in the waste gas to be treated.

According to the data obtained, the optimum volumetric ratio of ammonia to nitrogen oxides is 1 - 1.1. Under these conditions, the degree of purification of waste gas from nitrogen oxides is 95.6 - 97.6 percent, the ammonia content of purified gas being 0.003 - 0.005 percent by volume.

| $\dfrac{V_{NH_3}}{V_{NO+NO_2}}$ | Nitrogen oxides and ammonia content of waste gas, in per cent by volume | | | | Degree of purification, % |
| --- | --- | --- | --- | --- | --- |
| | before contact | | after contact | | |
| | $C_{NO+NO_2}$ | $C_{NH_3}$ | $C'_{NO}$ | $C'_{NH_3}$ | |
| 0.9 | 0.14 | 0.126 | 0.022 | 0.0015 | 84.5 |
| 1.0 | 0.16 | 0.16 | 0.007 | 0.003 | 95.6 |
| 1.1 | 0.20 | 0.22 | 0.005 | 01005 | 97.6 |
| 1.2 | 0.22 | 0.264 | 0.002 | 0.02 | 99.3 |
| 1.4 | 0.18 | 0.252 | 0.002 | 0.04 | 99.0 |

EXAMPLE 13

The catalyst having the composition as in Example 4, is tested as described in Example 1, at a temperature of 260° C at various volumetric velocities of the waste gas and at various volumetric ratios of ammonia to nitrogen oxides in waste gas to be treated.

According to the data obtained, the degree of purification from nitrogen oxides in the range of volumetric velocities of the gas from 10000 to 50000 hour$^{-1}$, is 96.8 – 99.5 percent.

velocity of gas passage is 10000 hour$^{-1}$ at a temperature of 350° C. The degree of purification of waste gase from nitrogen oxides is 98 – 100 percent.

| Nitrogen oxides, ammonia and chloride content of waste gas, % by volume | | | | | | $\dfrac{V_{NH_3}}{V_{NO_2}}$ | Degree of purification, % |
|---|---|---|---|---|---|---|---|
| before contact | | | after contact | | | | |
| $C_{Cl_2}$ | $C_{NO_2}$ | $C_{NH_3}$ | $C'_{Cl_2}$ | $C'_{NO_2}$ | $C'_{NH_3}$ | | |
| 0.330 | 0.103 | 0.140 | 0.330 | 0.002 | 0.00 | 1.4 | 97.7 |
| 0.113 | 0.096 | 0.140 | 0.100 | 0.000 | 0.0000 | 1.4 | 100 |

| Volumetric velocity of waste gas hour$^{-1}$ | Nitrogen oxides and ammonia content of waste gas, in percent by volume | | | | Purification degree % | $\dfrac{V_{NH_3}}{V_{NO+NO_2}}$ |
|---|---|---|---|---|---|---|
| | before contact | | after contact | | | |
| | $C_{NO+NO_1}$ | $C_{NH_3}$ | $C'_{NO}$ | $C'_{NH_3}$ | | |
| 10000 | 0.217 | 0.231 | 0.0033 | 0.0055 | 98.4 | 1.06 |
| 20000 | 0.137 | 0.157 | 0.0017 | 0.0270 | 98.7 | 1.14 |
| 30000 | 0.108 | 0.121 | 0.005 | 0.0135 | 99.5 | 1.12 |
| 50000 | 0.152 | 0.168 | 0.0050 | 0.0171 | 96.8 | 1.1 |
| 80000 | 0.100 | 0.118 | 0.020 | 0.0140 | 80.0 | 1.18 |

EXAMPLE 14

The catalyst is prepared as in Example 3, and tested under industrial conditions at a volumetric velocity of 20000 cu·m/hour at a pressure to 3.5 atm.

The composition of waste gas (in percent by volume): NO 0.08 – 0.20, NO$_2$ 0.045 – 0.10, O$_2$ 4 – 5, H$_2$O 1 – 2, nitrogen being the balance.

The results of the industrial test are as follows:

| Volumetric velocity of waste gas hour$^{-1}$ | Gas temperature,° C | | Nitrogen oxides and ammonia content of waste gas, %(v/v) | | | Purification, % | $\dfrac{V_{NH_3}}{V_{NO+NO_2}}$ |
|---|---|---|---|---|---|---|---|
| | before contact | after contact | before contact | | after contact | | |
| | | | $C_{NO+NO_2}$ | $C'_{NO}$ | $C'_{NH_3}$ | | |
| 6500 | 269 | 295 | 0.295 | 0.0057 | 0.0081 | 97.5 | 1.09 |
| 15000 | 261 | 270 | 0.116 | 0.0046 | 0.0057 | 96.0 | 1.08 |
| 30000 | 263 | 276 | 0.124 | 0.0034 | 0.007 | 97.8 | 1.2 |

EXAMPLE 15

Through a catalyst prepared as described in Example 3 is passed waste gas having the following composition, in percent by volume: SO$_2$ 0.045 – 0.166, NO 0.110, NH$_3$ 0.11 – 0.12, O$_2$ 10, the rest being nitrogen. The space rate of passage is 10000 hour$^{-1}$ at various temperatures.

The degree of purification of waste gas from nitrogen oxides is, at a temperature of 200° C 99.8 percent, and at a temperature of 320° C, 98.2 percent.

| t° C | Nitrogen oxides, ammonia, and sulphur dioxide content of waste gas, % vol. | | | | | | $\dfrac{V_{NH_3}}{V_{NO}}$ | Purification, degree, % |
|---|---|---|---|---|---|---|---|---|
| | before contact | | | after contact | | | | |
| | $C_{SO_2}$ | $C_{NO}$ | $C_{NH_3}$ | $C'_{SO_2}$ | $C'_{NO}$ | $C'_{NH_3}$ | | |
| 200 | 0.127 | 0.101 | 0.110 | 0.130 | 0.0002 | 0.0005 | 1.1 | 99.8 |
| 280 | 0.045 | 0.115 | 0.120 | 0.045 | 0.002 | 0.005 | 1.05 | 98.1 |
| 320 | 0.166 | 0.110 | 0.110 | 0.166 | 0.002 | 0.007 | 1.0 | 98.2 |

EXAMPLE 16

Through a catalyst prepared as described in Example 8, passed is waste gas of the following composition, in percent by colume: Cl$_2$ 0.113, 0.330, No$_2$ 0.100, NH$_3$ 0.140, O$_2$ 21, nitrogen being the balance. The volumetric

What is claimed is:

1. Method of selectively removing nitrogen oxides from waste gases by reducing said nitrogen oxides with ammonia, which comprises a waste gas containing nitrogen oxides in admixture with a substantially stoichiometric amount of gaseous ammonia through a catalyst at a temperature of 100° – 500° C, at a volumetric velocity of passage of 5000 – 100,000 hour and a volumetric ratio of the gaseous ammonia to nitrogen oxides of 0.7 – 1.5, said catalyst consisting essentially of a mixture of oxides of vanadium and manganese applied to an inert carrier said oxides being taken in a weight ratio of V$_2$O$_5$/Mn$_2$O$_3$ of 0.1 – 30, the total content of said oxides of vanadium and manganese being 5–40 percent of the total weight of the catalyst, whereby substantially all of the nitrogen oxides are reduced to nitrogen and the waste gas is thus purified of nitrogen oxides.

2. Method according to claim 1 wherein said temperature is 200°–400° C.

3. Method according to claim 1 wherein said temperature is 200°–360° C.

4. Method according to claim 1 wherein said waste gas contains up to 0.4% by volume of at least one of the gases sulphur dioxide, chlorine and carbon monoxide without affecting the activity of the catalyst.

5. Method according to claim 1 wherein said temperature is 220°–320° C.

* * * * *